United States Patent [19]
Hoffmüller et al.

[11] Patent Number: 5,660,320
[45] Date of Patent: Aug. 26, 1997

[54] METHOD OF MANUFACTURING A METALLIC COMPONENT OR SUBSTRATE WITH BONDED COATING

[75] Inventors: Wilhelm Hoffmüller, München; Josef Eichner, Scheyern; Robert Sigl, Ergolding; Thomas Uihlein, Dachau, all of Germany

[73] Assignee: MTU Motoren-Und Turbinen-Union München GmbH, München, Germany

[21] Appl. No.: 556,434

[22] Filed: Nov. 9, 1995

[30] Foreign Application Priority Data

Nov. 9, 1994 [DE] Germany .......... 44 39 950.2

[51] Int. Cl.$^6$ .......... C25D 5/50; C25D 15/00; C23C 28/00
[52] U.S. Cl. .......... 228/122.1; 205/109; 205/110; 205/228; 427/203; 427/205; 427/376.6; 427/376.8; 428/614
[58] Field of Search .......... 205/109, 110, 205/228; 228/121, 122.1; 428/614; 427/376.6, 376.7, 376.8, 203, 205

[56] References Cited

U.S. PATENT DOCUMENTS

| | | | |
|---|---|---|---|
| 3,743,556 | 7/1973 | Breton et al. | 156/62.8 |
| 4,116,689 | 9/1978 | Kaarlela | 75/229 |
| 4,169,020 | 9/1979 | Stalker et al. | 204/16 |
| 4,608,128 | 8/1986 | Farmer et al. | 204/16 |
| 4,627,896 | 12/1986 | Nazmy et al. | 204/37.1 |

FOREIGN PATENT DOCUMENTS 4241420  11/1993  Germany .

Primary Examiner—Kathryn L. Gorgos
Assistant Examiner—William T. Leader
Attorney, Agent, or Firm—Ladas & Parry

[57] ABSTRACT

A metallic alloy part having a bonded coating that includes dispersed hard-material particles embedded in a metal matrix, composed of a eutectic solder whose alloy elements include at least the base metal of the metallic alloy part. The solder is formed by fusion bonding on the metallic alloy part, a precoating composed of sequential layers of the elemental components of the solder applied on the metal part or on the hard-material particles. The composition and disposition of the various layers are graduated such that the melting points of the elemental solder components increase towards the outermost layer.

20 Claims, 3 Drawing Sheets

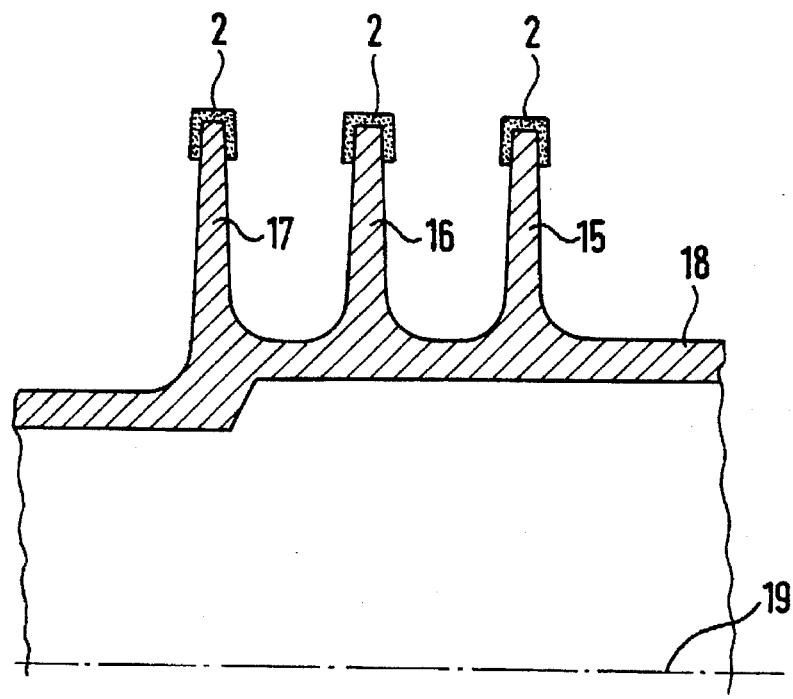
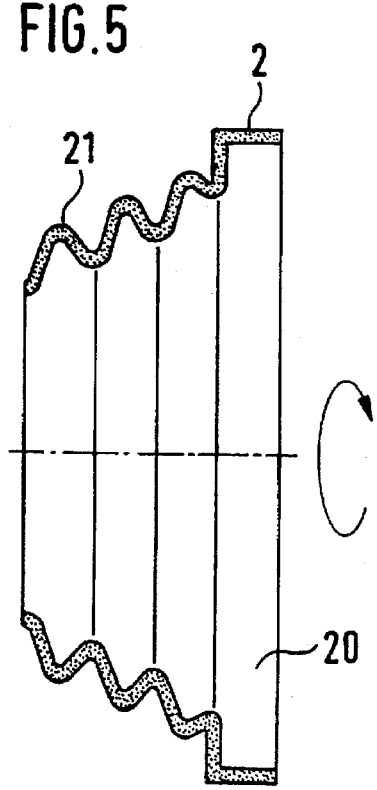
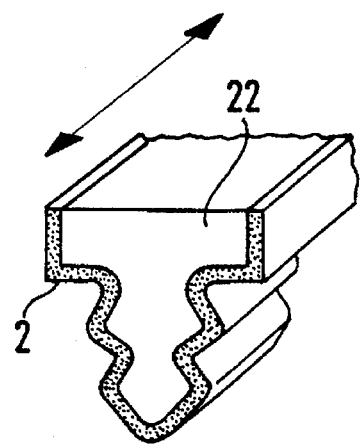

METHOD OF MANUFACTURING A METALLIC COMPONENT OR SUBSTRATE WITH BONDED COATING

FIELD OF THE INVENTION

This invention relates to a metallic component or substrate with a bonded coating which includes disperse hard-metal particles entrapped in a metal matrix.

The invention further relates to a method for manufacture of such metallic component or substrate.

BACKGROUND AND PRIOR ART

Continuing improvements in the performance of modern aircraft engines have resulted in pressure increases therein, for example, in the high-pressure compressor, of 2 MPa at temperatures up to 650° C. At these extreme conditions, abradable nickel and carbon-base linings of stators, which blade tips of rotors abrade, are only of limited value as the surfaces of such conventional abradable linings are substantially entirely eroded by erosive attack. If the abradable linings are made of materials of greater hardness and erosion resistance, however, the rotor blades are subjected to possible damage and fracture. If the blade tips are hardened by means of complex bonded coatings, such as disclosed in U.S. Pat. No. 4,169,020, wherein abrasive particles are embedded in a metal matrix, this problem can be solved. The abrasive particles are made of metal compounds and are referred to hereafter as hard-metal particles.

In the method disclosed in U.S. Pat. No. 4,169,020, hard-metal particles suspended in an elecrodeposition bath are entrapped during electrodeposition of the matrix metal and fixed on the surface of the part by the electrolytically deposited matrix. This method has a disadvantage that the disposition of the particles in the matrix is uncontrolled, and particles can be introduced into the matrix metal only if they are relatively small and suspendable therein. Ultimately, the composition of the matrix with regard to the base metal cannot be optimized, for the reason that there are limits on the complex matrix compositions that can undergo electrodeposition.

Disclosed in German application Ser. No. P 42 41 420.2 is a method for first fixing the hard-metal particles on the part or substrate using a fused salt bath and then electrodepositing the metal matrix.

This method has the disadvantage that extremely critical process parameters must be maintained during electrodeposition to minimize the loss of hard-metal particles fixed by the salt, considering that the salt dissolves in the electrodeposition bath and the hard-metal particles must simultaneously be secured in position by the metal being deposited. Also, the matrix alloy composition usable in this method is extremely limited and not freely selectable.

Standard brazing or soldering methods cannot be utilized due to the unwettability of the hard-metal particles or by the relatively small contact surfaces between the hard-metal particles and the part or substrate surface, so that only a thin-film bond is achieved, while build-up of a metal matrix largely enveloping the hard-metal particles is not achieved. To fill the interstices with matrix metal, therefore, an additional process operation is needed that often is limited by the unwettability of the hard-metal particles or requires elevated fusion temperatures high enough to dissolve the solder layer.

With state-of-the-art compressors, difficulties are encountered especially when an attempt is made to hardface rotor blades of the last stages of the compressors, considering that the coating area available on the blade tips is relatively small compared to the turbine blades or blade tip surfaces at the earlier stages. Cap-shaped hardfacing on blade tips are disclosed in U.S. Pat. No. 4,169,020 and German application Ser. No. P 41 42 420.2, but these cannot be used on rotor blades in the last compressor stages. Another problem encountered is that the base material increasingly favored for the last compressor stages is titanium. Compared with Fe, Ni or Co-base alloys, titanium-base alloys have a greater tendency to crack. Accordingly, hard-metal particles introduced in layers on the tips of titanium-base alloy rotor blades often act as crack nuclei, or due to the necessary high-temperature heat treatment for the hardfacing operation, the metal structure of the rotor blades is unfavorably affected. Both effects appreciably impair the fatigue strength of the titanium-base alloy rotor blades with conventionally deposited hardfacing. This leads to premature airfoil failures in the last compressor stages and may ultimately render the engine inoperable.

SUMMARY OF THE INVENTION

It is an object of the present invention to provide a part or substrate and a method for manufacturing such part or substrate to overcome the disadvantages in the known art and to provide a metal layer sufficiently thick to entrap and secure the hard-metal particles therein in a single process operation.

It is another object of the invention to improve the reliability by which hard-metal particles are introduced into the part or substrate coating and to permit the introduction of a large volume of preformed hard-metal particles into a metal matrix on the part or substrate.

This is achieved by making the matrix a eutectic solder whose alloys contain at least the base metal of the part or substrate and which is formed by fusion bonding a precoating consisting of the elemental components of the solder, where the part, the substrate or the hard-metal particles are coated with various layers containing the elemental components of the solder and the various layers are graduated in terms of composition and disposition such that the melting points of the elemental components of the solder increase from the surface of the metal part towards the outer layers.

The composition and disposition of a layered precoating of the elemental components of the matrix material on the part, substrate or hard-metal particles provide the advantage that such precoating can be given any desired thickness, which provides sufficient matrix material to form the bonded coating on the part or the substrate in a single process operation. In the process, the thicknesses of individual layers of the precoating can be regulated relative to one another such that suitable eutectic fusion of the precoating layers to form a eutectic solder becomes possible. For the purpose, a eutectic alloy of the base element of the base metal of the part or substrate is selected, which advantageously has its melting point below that of the base element of the base metal, to insure that during the thermal treatment needed to melt the matrix from the precoating layers, the base metal will not change structurally and that thermally induced damage is precluded. Also, precoating with the elemental components of a eutectic alloy of the base element of the base metal in the sequence provided by the present invention assures that during fusion of the layered precoating, an intensive bond is created at the interface between the part or substrate surface and the matrix through eutectically fusing areas of the part or substrate surface. This positive effect is promoted by graduating the layers such that the melting points of the elemental components of the solder or precoating increase towards the outer layers. This advantageously also keeps the layered precoating extremely resistant to environmental impact and makes it suitable for extended storage periods before use.

The hard-metal particles preferably consist of metal carbides, nitrides, oxides or mixtures thereof, where the temper dictates the application. Accordingly, preferred are cubic boron nitride, chrome carbide, silicon carbide, corundum (aluminum oxide) or titanium carbide in hard-metal applications, these materials being characterized by temperature resistance, oxidation resistance and high temper.

In accordance with the present invention, the matrix metal is a eutectic solder of the base metal of the part or substrate, so that as further elemental alloying components in addition to the base element, use can be made, preferably of copper, nickel, tin, zinc, silver, gold or combinations thereof. The factors leading to the selection and composition of the further alloying components are the fusion temperature lowering effect and the ability to form a eutectic alloy with the base element. It has been shown, for example, that additions, by weight, of only 15% nickel and 15% copper to titanium, whose melting temperature is 1660° C., will appreciably lower the melting point of the matrix, making this solder composition desirable, for titanium-base alloy parts.

Preferred base metals of the metallic part or substrate on which the bonded coating is deposited, in accordance with the present invention, are nickel-, cobalt-, iron- or titanium-base alloys. These alloys are widely used in engine construction for airfoils, rotor disks and turbine shafts, and it will be advantageous to deposit hardfacing, in accordance with the present invention, on components of such base metals in highly exposed engine areas. Accordingly, the metal matrix of this hardfacing preferably is a eutectic solder alloy containing nickel, cobalt, iron or titanium fractions, where the fraction of the base element in the solder preferably is at least 60%, by weight, of the solder composition.

To manufacture metallic parts or substrates with bonded coatings including disperse hard-metal particles entrapped in a metal matrix, the following process operations are performed:

a) coating the base metal or the hard-metal particles with the elemental components of a eutectic solder containing the base metal of the base material, where the composition and disposition of the various layers are graduated such that the elemental component of the highest melting point is deposited last, b) applying the hard-metal particles on the part or substrate, c) fusing the solder components at soldering temperature in a protective gas or in a vacuum to form a matrix that at least partially envelopes the hard-metal particles, and d) fixing the bonded coating to the base metal upon cooling thereof.

This method provides an advantage that the volume of the entire matrix metal requirement can be met in the coating layers, and by the eutectic fusion of these coating layers, a perfect bonded coating of matrix metal and hard-metal particles is achieved in a a single process operation without causing damage to the part or substrate surface or the loss of hard-metal particles. This method therefore reduces manufacturing costs.

Also, precoating with layers of elemental components of a eutectic alloy of the base element of the base material ensures that when the layered precoating is fused, an intensive bond is obtained at the interface between the part or substrate surface and the matrix through eutectically fused areas of the part or substrate surface. This positive effect is promoted by graduating the various layers such that the melting points of the elemental components of the solder or precoating increase towards the outer layers. Since the lowest melting point component will melt first and can so react with the surface of the part, substrate or hard-metal particle before the eutectic solder has completely turned into an initially liquid metal matrix, excellent adhesion is achieved between the matrix and the part or substrate, and if the hard-metal particles are wettable, also intensive cross-linking can be achieved between the surfaces of the hard-metal particles and the matrix.

To improve wettability, the hard-metal particles are preferably coated with a layer of the base metal of the base material. Also, the part or substrate is preferably coated with a layer of the base metal of the base material to protect the interface between the base material and the matrix from direct attack by the eutectic solder and advantageously to prevent depletion of the base element in the base material at the fusion surface between the low melting eutectic alloy component and the base material.

In a preferred implementation of the method, the layers of elemental components are applied by physical deposition, preferably sputtering, evaporation or spraying, or by chemical vapor deposition (CVD). This provides the advantage that the alloy components required for the composition of the eutectic solder containing the base element of the base material can be accurately proportioned in accordance with the graduation of the melting points and their percentage fractions in the alloy, and deposited in layers. The percentage fraction determines the thickness of each layer, and the melting point determines the sequence of the layers.

In a further preferred implementation Of the method, the layers of elemental components are preferably applied to the part of substrate by electrodeposition. Compared with the currently utilized methods of deposition, where the final composition of the matrix is deposited all at once, the method Of the invention provides the advantage that electrodeposition in layers permits the composition of the solder to be selected much more accurately and with a wider choice of components.

To fix the hard-metal particles on the layers on the part or substrate, an outer layer of cementatious material, preferably a thermoplastic material, cam be applied and hardened during or after application. This additional cementatious layer provides the advantage that individual large-volume or preformed hard-metal particles can accurately be disposed on the part or substrate surface. A layer of thermoplastic cement also enables the adhesive effect of the cementatious layer to be activated by simple heating and the hard-metal particles to be fixed upon suitable cooling. The thermoplastic material can subsequently serve as a flux when the eutectic solder is being fused and can evaporate in the final fusion phase without leaving residues.

The layers on the part or substrate can be graduated also in the form of a film or foil. Such a film comprises the inventive layers of the elemental components of the eutectic solder. This solution provides the advantage that the matrix material can be preformed with a suitable thickness and subsequently fixed on the part or substrate surface, preferably by resistance spot welding, in areas according to the shape of the part or substrate.

According to a further aspect of the present invention, the layer of solder on the part or substrate can be applied by means of a bonded film. In the bonded film, a powdered solder of elemental components can be bonded into a resin material, or solder fibers or wires can be formed into a fabric that is impregnated with resin to form a bonded film. Both the powdered solder and the solder fibers or wires embody the layered structure characterizing the present invention. The resin serves as a flux and to bond the hard-metal particles when the parts or substrates are being coated. A preferred option also exists to include the hard-metal particles in the bonded film to produce a fabric which includes all the components of the bonded coating to be formed. Then, when the powdered solder or the solder fibers or wires are melted, the resin or flux evaporates. The bonded film provides the advantage that it is extremely flexible mechanically and can be applied to parts or substrate surface structures of very complex shape.

If the resin of the bonded film is not sufficient to develop adequate adhesive action to hold the hard-metal particles on the part or substrate surface, or if use is made of a metallic soldering film, the film or the bonded film can be fixed on the part or substrate surface by means of a cementatious material, preferably a suitable resin. If the film has sufficient electrical conductivity, the film can be spot welded in place by electrical resistance welding.

To fix individual hard-metal particles on the part or substrate surface that has previously been coated with a metal layer or the metallic precoating of the present invention, preferred use is made of resistance welding. For this purpose, a resistance welding electrode tip is positioned on a hard-metal particle and the particle is bonded at its contact points to the part or substrate surface by applying a current pulse. The electrode tip can also have a flat shape to permit the fixing of hard-metal particles over a larger area rather than fixing each hard-metal particle individually. This variant of the method is suitable especially when using preformed hard-metal particles.

In a still further preferred implementation of the method of the invention, the hard-metal particles are mixed with a paste comprised of flux and the elemental component of the solder in a powder form and then are applied to the surfaces, after which they are fused in place. This method is especially suitable for small-volume hard-metal particles, where the solder powder is again graduated in layers in accordance with the present invention.

This method is essentially used for manufacturing abrasive coatings, preferably for manufacturing seal coatings on the blades of turbomachines, on labyrinth-type seals, on turbomachine shrouds or on highly exposed areas of rotors, such as blade tips or seal fins. The method and materials can also be used for manufacturing abrasive layers, preferably in the manufacture of grinding wheels.

It is particularly advantageous to employ the inventive coating and the inventive method for rotor blades made of titanium-base alloys, in which the mean particle diameter of the hard-metal particles in the hardfacing preferably is at least 10 µm. This will advantageously provide for sufficient run-in properties of the hardfacing when the tips of the blades abrade the abradable coating of the stator structure. The upper limit of the mean particle diameter depends on the thickness of the airfoil at the blade tip area and preferably does not exceed 200 µm. Relative to maximum airfoil thickness, the upper limit of the hard-metal particle diameter is about one-half the maximum airfoil thickness at the blade tip area. Also, the preferred hard-metal particle spacing is maintained on the order of mean particle diameter, which advantageously improves the abrasive action of the particles. The particles finally protrude from their solder matrix bed by at least one-third of their mean diameter.

BRIEF DESCRIPTION OF THE FIGURES OF THE DRAWING

FIG. 4 is a sectional view, on enlarged scale, illustrating three fins of a labyrinth-type seal on an engine shaft.

FIG. 5 is a sectional view of a rotatable crushing-grinding wheel with an abrasive hardfacing in accordance with the present invention.

FIG. 6 is a perspective view of a portion of a broaching tool having an abrasive hardfacing in accordance with the present invention.

DETAILED DESCRIPTION OF PREFERRED EMBODIMENTS

Figure 1:
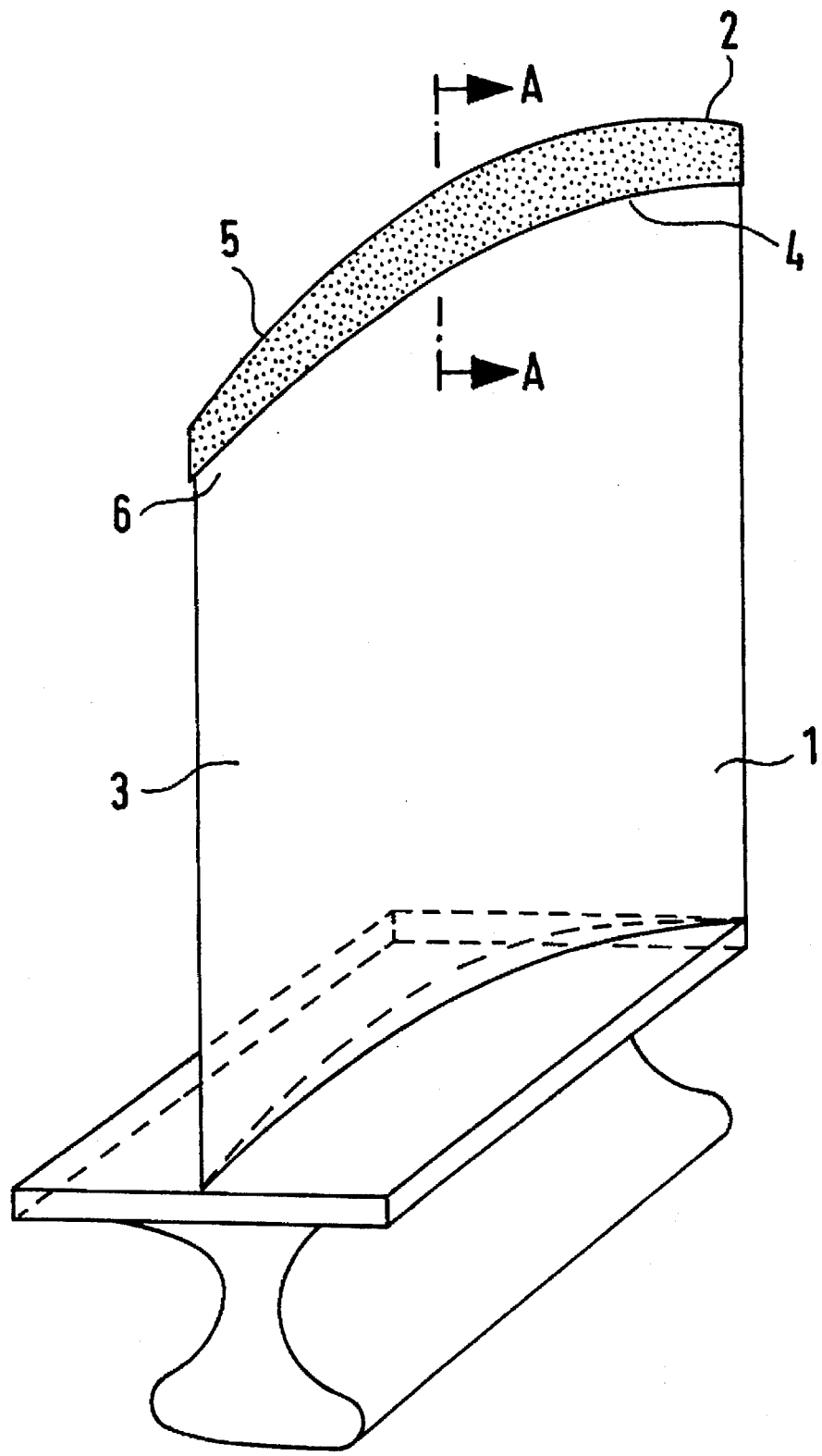
FIG. 1 is a perspective view of a rotor blade of a turbomachine provided with an abrasive surface layer at its tip.

FIG. 1 shows an article in the form of a blade 1 of a rotor of a turbomachine having a hardfacing 2 applied on the airfoil 3 in the region of the tip 4 of the blade. The blade comprises a metallic part 6 or substrate with a bonded coating 5 of the hardfacing 2 adapted to act as an operating surface to abrade an abradable lining of a surrounding stator structure (not shown) to form a minimal clearance gap seal between the blade tip and the surrounding stator structure.

For this purpose, the abrasive coating includes abrasive particles of metal compounds, referred to as hard-metal particles, embedded in a metal matrix which securely anchors the hard-metal particles and simultaneously is connected to the tip of the blade, preferably by a bond coat. In accordance with the present invention, the matrix and bond coat of the present embodiment consist of a eutectic solder, whose alloys include as one of the elements thereof, the base material of the part 6. The presence of the base material fraction in the solder in itself ensures ideal compatibility with the base material of the part 6. This compatibility refers both to the coefficients of thermal expansion of the part 6 and the hardfacing 2 and the adhesion of the matrix or solder on the part 6. In this embodiment, the part 6 is made of a titanium-base alloy and the solder contains up to 70% titanium, by weight.

Additional solder components, such as copper and nickel, lower the melting point, and are deposited in layers as alloys or solder elements on the part 6. The layers serve as a precoating of the part 6 and the hard-metal particles and when they are fused at soldering temperature, they form the metal matrix together with the base metal fraction. In this embodiment, the precoating comprises layers of the elemental components of the solder, and the composition and the disposition of the various layers is such that the layers are graduated so that the melting points of the elemental components of the solder progressively increase in the outwards direction of the layers. In this embodiment, to obtain a precoating 100 µm thick, the low-melting copper is first deposited to a thickness of 9 µm on the face of the blade tip 4. Thereon, a 9 µm nickel layer is deposited, and finally an 82 µm titanium layer is sputter deposited thereon, so that when fusion is effected at soldering temperature, a solder containing, by weight, 15% copper, 15% nickel and 70% titanium is produced. This solder envelopes the hard-metal particles, which in this embodiment have a mean diameter of 80 µm and consist of cubic boron nitride, and the solder bonds the hard-metal particles to the face of the blade tip. In this embodiment, the maximum blade width in the blade tip area is only 200 µm, as this is a rotor blade for the last stages of a compressor of the engine.

Figure 2A:
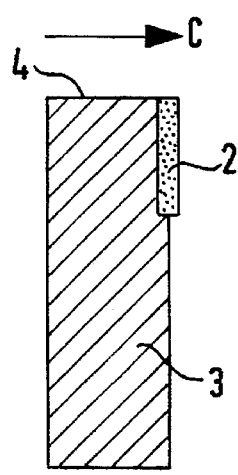
FIGS. 2a–2c are enlarged sectional views taken along line A—A in FIG. 1 showing different embodiments of abrasive surface layers according to the invention.
Figure 2B:
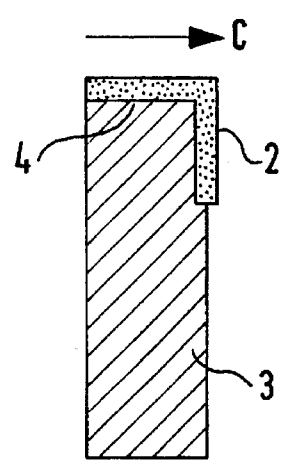
Figure 2C:
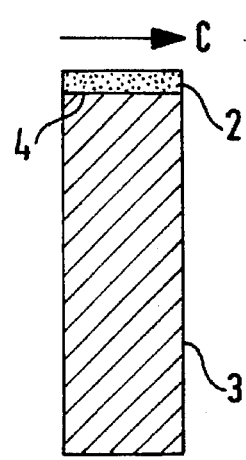

The hardfacing 2 on the blade tip 4 can be arranged in various ways on the substrate relative to the direction of rotation of the rotor. Referring to FIGS. 2a to 2c, therein are shown various arrangements of hardfacing layers 2 on the blade relative to the direction of rotation c. In FIG. 2a, only the leading surface is hardfaced in the area of blade tip 4. In FIG. 2b, the hardfacing layer 2 is applied both to the edge surface of the blade tip 4 and the leading surface of the airfoil 3, in the area of blade tip 4. In FIG. 2c, the hardfacing layer 2 is arranged most advantageously on the edge face of the blade tip 4. The diameter of the hard-metal particles and the thickness of the various solder layers are correlated so that the hard-metal particles protrude from the solder coating, formed by the fused layers, by at least one-third of their diameter.

Figure 3:
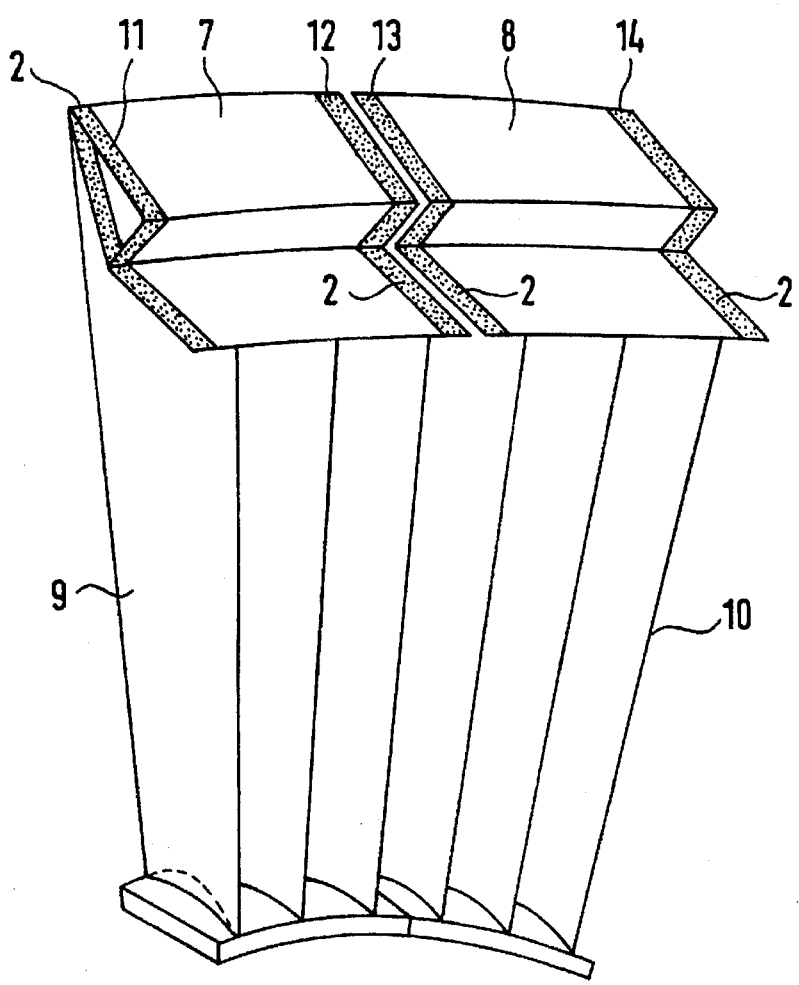
FIG. 3 illustrates shroud segments of two blade cascade segments, the frontal areas of which are provided with a protective coating in accordance with the present invention.

FIG. 3 shows shroud segments 7 and 8 of two cascade segments 9 and 10 of a rotor wherein the faces 11, 12, 13 and 14 of the shroud segments are provided with a bonded coating in accordance with the present invention. In engine service, the loosely Joined cascade segments 9 and 10 rub against one another at faces 12, 13. These are protected from wear and erosion by means of the hardfacing 2 comprised of a metal matrix and hard-metal particles having a mean particle diameter of 3 to 15 μm.

A further preferred embodiment of the present invention is shown in FIG. 4, where an article with three labyrinth seal fins 14, 15, 17 is provided on an engine shaft 18 that rotates around its longitudinal center line 19. The labyrinth seal fins 15, 16, 17 have a hardfacing 2 thereon in accordance with the present invention by which the fins work their way into abradable linings (not shown) enveloping the fins annularly to form a seal with minimum clearance during a run-in operation. For this purpose, the hard-metal particles are embedded in the matrix such that they protrude from the matrix by at least one-third of their mean diameter.

As shown in FIG. 5, the present invention also provides means for grinding a fir-tree profile into blade roots, said means being an article in the form of a correspondingly shaped grinding wheels 20 whose outer circumference 21 is coated with the hardfacing 2 of the present invention containing hard-metal particles of a mean diameter between 10 to 100 μm. Corresponding companion fir-tree slots can be formed in circumferentially spaced relation on a rotor disk by a suitable broaching tool 22 as shown in FIG. 6. For this purpose, the broaching tool 22 is formed with hardfacing 2 containing silicon carbide particles of a mean diameter of 10 to 100 μm.

What is claimed is:

1. A method of manufacturing a metal part having a bonded coating on said part, said method comprising:

providing, on a surface of a metal alloy part, metal compound particles and a succession of layers of elemental component of a eutectic solder in which the elemental component of one of said layers is the same as a metal element of said metal alloy part, said layers being arranged so that melting points of the elemental components in said layers increase successively towards the outermost of the layers, melting and fusing said elemental components in said layers to form a metal matrix of said eutectic solder which at least partially envelops said particles and bonds the particles and said metal alloy part.

2. A method as claimed in claim 1, wherein said particles are selected from the group consisting of metal carbides, metal nitrides, metal oxides and combinations thereof.

3. A method as claimed in claim 2, wherein said metal alloy part comprises an alloy of elements selected from the group consisting of nickel, cobalt, iron and titanium.

4. A method as claimed in claim 1, wherein said elements of said eutectic solder of said metal matrix are selected from the group consisting of nickel, cobalt, iron and titanium.

5. A method as claimed in claim 1, wherein said particles project from said metal matrix and form an abrasive surface for said metal part.

6. A method as claimed in claim 1, wherein the first of said layers is said one of said layers whose elemental component is the same as a metal element of said metal alloy part.

7. A method as claimed in claim 6, comprising depositing said layers by sputtering, evaporating, spraying or chemical vapor deposition.

8. A method as claimed in claim 6, comprising depositing said layers by electrodeposition.

9. A method as claimed in claim 6, comprising applying said layers on said metal alloy part, applying an outer adhesive layer on said layers and fixing said particles to said adhesive layer.

10. A method as claimed in claim 9, comprising initiating adhesive properties of said outer adhesive layer during or after deposition of said adhesive layer.

11. A method as claimed in claim 1, comprising applying said layers as a film.

12. A method as claimed in claim 11, wherein said film is applied on the part by resistance spot welding of said film to said part.

13. A method as claimed in claim 11, wherein said film layers Comprise respective powdered elemental components bonded in a resin, said resin bonding said particles to said part when said metal layers are melted while serving as a flux which then evaporates.

14. A method as claimed in claim 13, comprising fixing said film on said metal part by a cement.

15. A method as claimed in claim 1, comprising applying on said part said succession of layers and said particles as a film containing respective elemental solder components and said particles embedded in a resin.

16. A method as claimed in claim 15, wherein said film of said succession of layers and said particles is applied to said part by fixing said film to said part by resistance welding.

17. A method as claimed in claim 1, wherein said particles are mixed in a paste consisting of flux and said elemental components of the solder in a powdered form and thereafter deposited on said part and then fusion bonded thereto.

18. A method as claimed in claim 1, wherein said metal alloy part comprises a component of a turbomachine selected from the group consisting of turbine blades, labyrinth seals, and blade shrouds.

19. A method as claimed in claim 1, wherein said metal alloy part comprises a compressor rotor blade made of a titanium base alloy.

20. A method as claimed in claim 1, wherein said metal alloy part is a grinding wheel whose bonded coating comprises an abrasive layer.

* * * * *